United States Patent [19]
Donoghue et al.

[11] 3,930,922
[45] Jan. 6, 1976

[54] PROCESS CONTROL

[75] Inventors: John Francis Donoghue; Dan Edward Forney; Robert Lee Heiks, all of Columbus; Gerald A. Lasson, Dublin; Robert Eugene McCall, Columbus; Charles Ray Rich, Powell, all of Ohio

[73] Assignee: Industrial Nucleonics Corporation, Columbus, Ohio

[22] Filed: June 12, 1972

[21] Appl. No.: 261,997

[52] U.S. Cl. .................... 156/243; 118/8; 156/110; 156/256; 156/360; 156/394; 156/405; 235/151.3; 235/151.13; 250/360; 425/141; 427/152
[51] Int. Cl.² ........................................ B32B 31/06
[58] Field of Search ........... 156/360, 243, 356, 405, 156/394, 128, 129, 130; 235/151.3, 151.13; 250/360; 264/175; 425/141; 117/68; 118/8

[56] References Cited
UNITED STATES PATENTS

| | | | |
|---|---|---|---|
| 1,969,232 | 8/1934 | Nixon | 156/243 X |
| 2,750,986 | 6/1956 | Russell et al. | 156/360 X |
| 3,006,225 | 10/1961 | Mamas | 80/56 |
| 3,067,939 | 12/1962 | Ziffer | 235/151.3 |
| 3,159,516 | 12/1964 | Harris | 156/243 |
| 3,190,261 | 6/1965 | Ziffer | 250/360 |
| 3,292,208 | 12/1966 | Wood | 425/141 |
| 3,307,215 | 3/1967 | Gerhard et al. | 425/141 |
| 3,378,676 | 4/1968 | Clement | 235/151.3 |
| 3,405,267 | 10/1968 | Chope | 250/308 |
| 3,510,374 | 5/1970 | Walker | 425/141 |
| 3,515,860 | 6/1970 | Fitzgerald, Jr. | 235/151.13 |
| 3,531,827 | 10/1970 | Dragonette | 425/141 |
| 3,562,500 | 2/1968 | Grant | 235/151.3 |
| 3,566,092 | 2/1971 | Grant | 235/151.3 |
| 3,599,288 | 8/1971 | Eakman | 425/141 |
| 3,609,318 | 9/1971 | Anderson | 235/151.3 |
| 3,610,897 | 10/1971 | Gerhard | 235/151.3 |
| 3,635,627 | 1/1972 | Palmer | 425/141 |

FOREIGN PATENTS OR APPLICATIONS

| | | | |
|---|---|---|---|
| 940,383 | 10/1963 | United Kingdom | 156/356 |
| 774,088 | 12/1967 | Canada | 156/128 |

Primary Examiner—Clifton B. Cosby
Attorney, Agent, or Firm—William T. Fryer III; Allan M. Lowe; Walter W. Nielsen

[57] ABSTRACT

A process monitoring and control system is provided for use in a tire calendering system producing a strip of rubber tire material comprising a layer of tire cord laminated between first and second layers of rubber. In a preferred embodiment, the thickness of the first rubber layer is measured by a single point radiation backscatter gauge at a point prior to its lamination with the tire cord and second layer. The thickness of the first layer is controlled to a desired target by means of a control loop including the single point gauge. The total thickness of the combined layers is measured at the calender output by a total thickness gauge. Gauge coordination means, including a delay means, are provided whereby measurements of the thickness of the first layer and of the combined strip are derived over the same longitudinal portion of the strip. Means are included, responsive to the coordinated measurements, to control the thickness of the second layer to maintain the total thickness of the strip at a desired total thickness target, in such a way as to eliminate any error in the thickness of the first layer as a factor affecting the control of total thickness. In this manner, the desired total thickness of the calendered material and the desired position of the tire cord between the first and second rubber layers are maintained.

13 Claims, 3 Drawing Figures

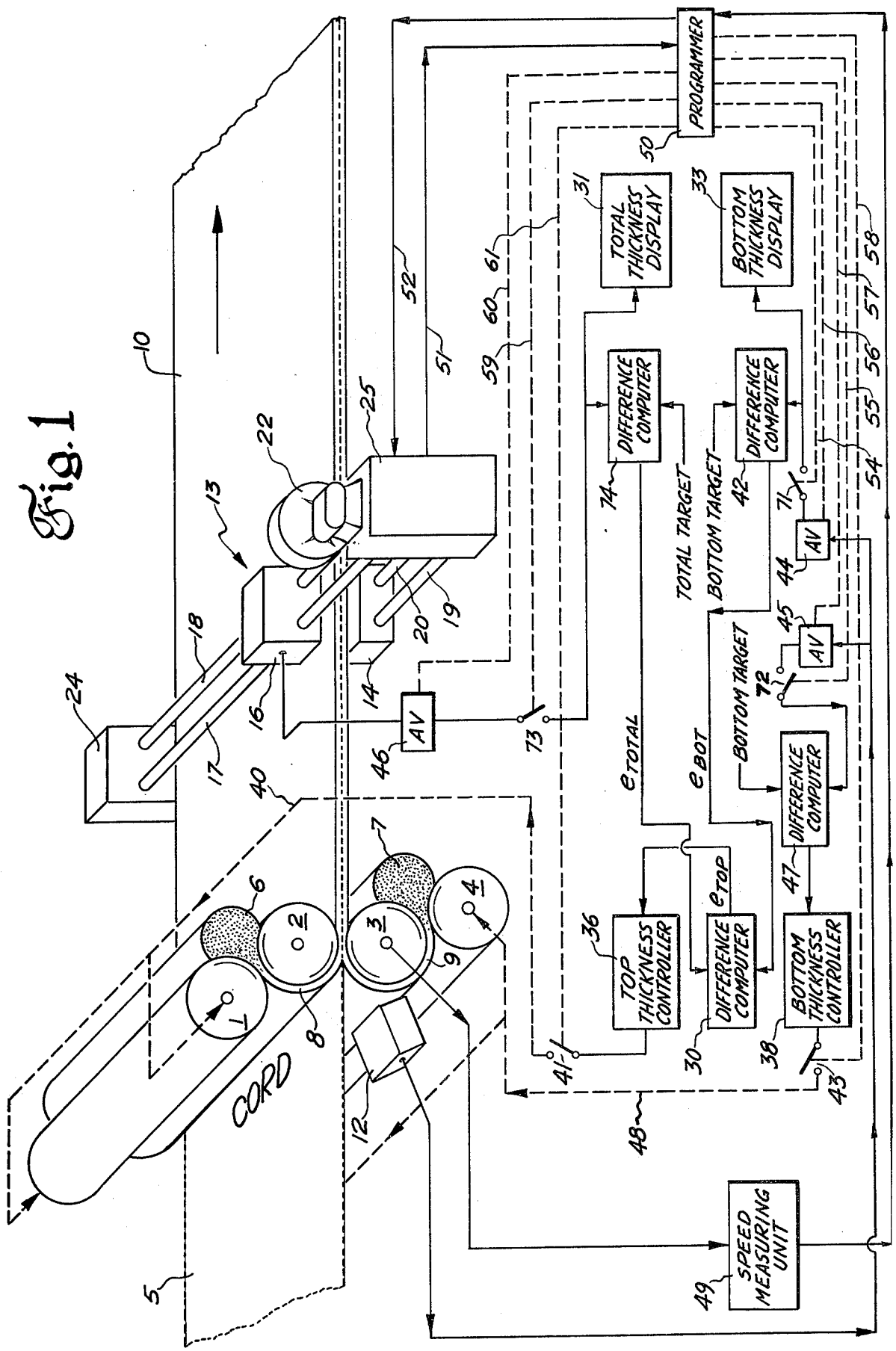

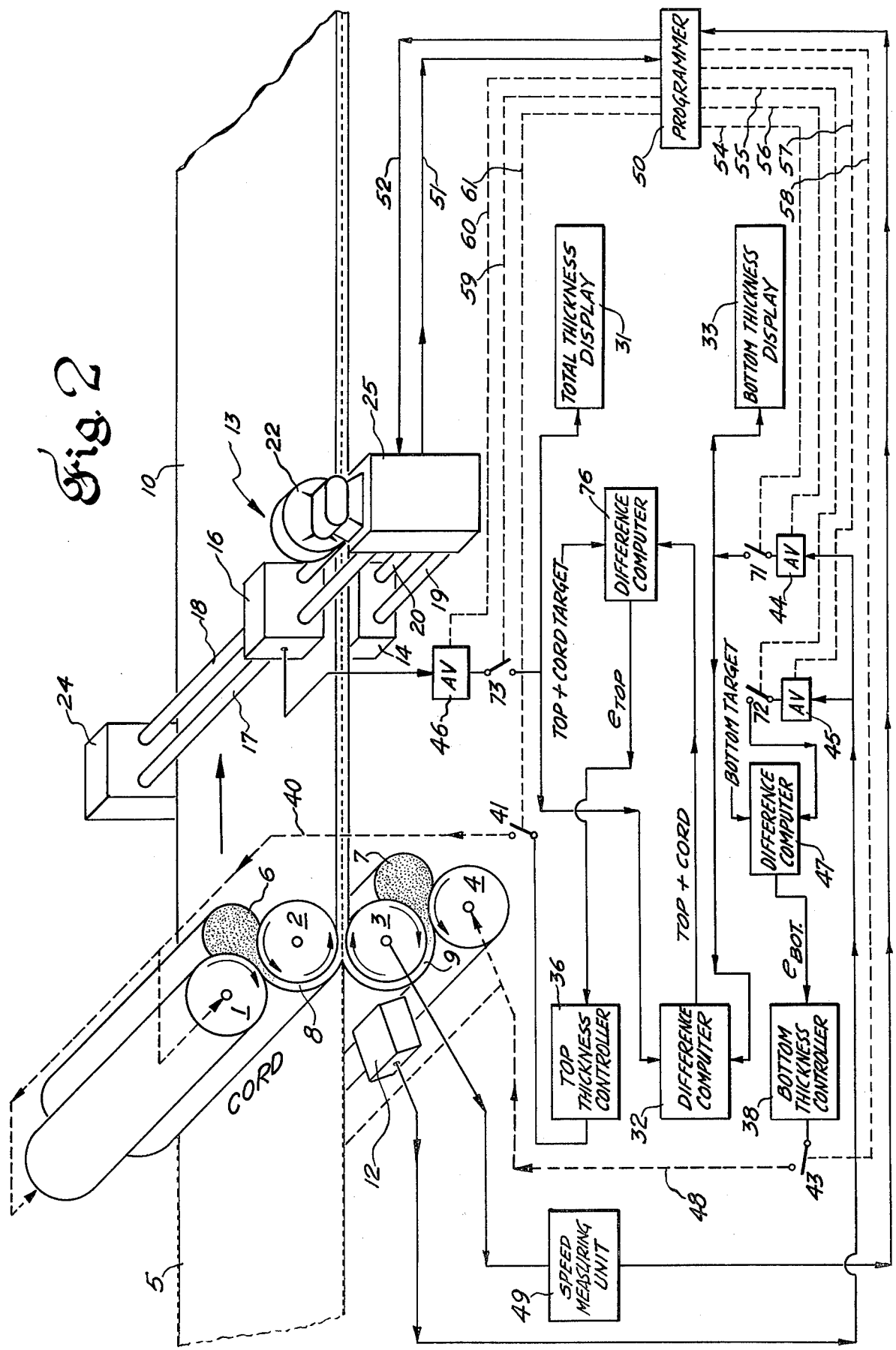

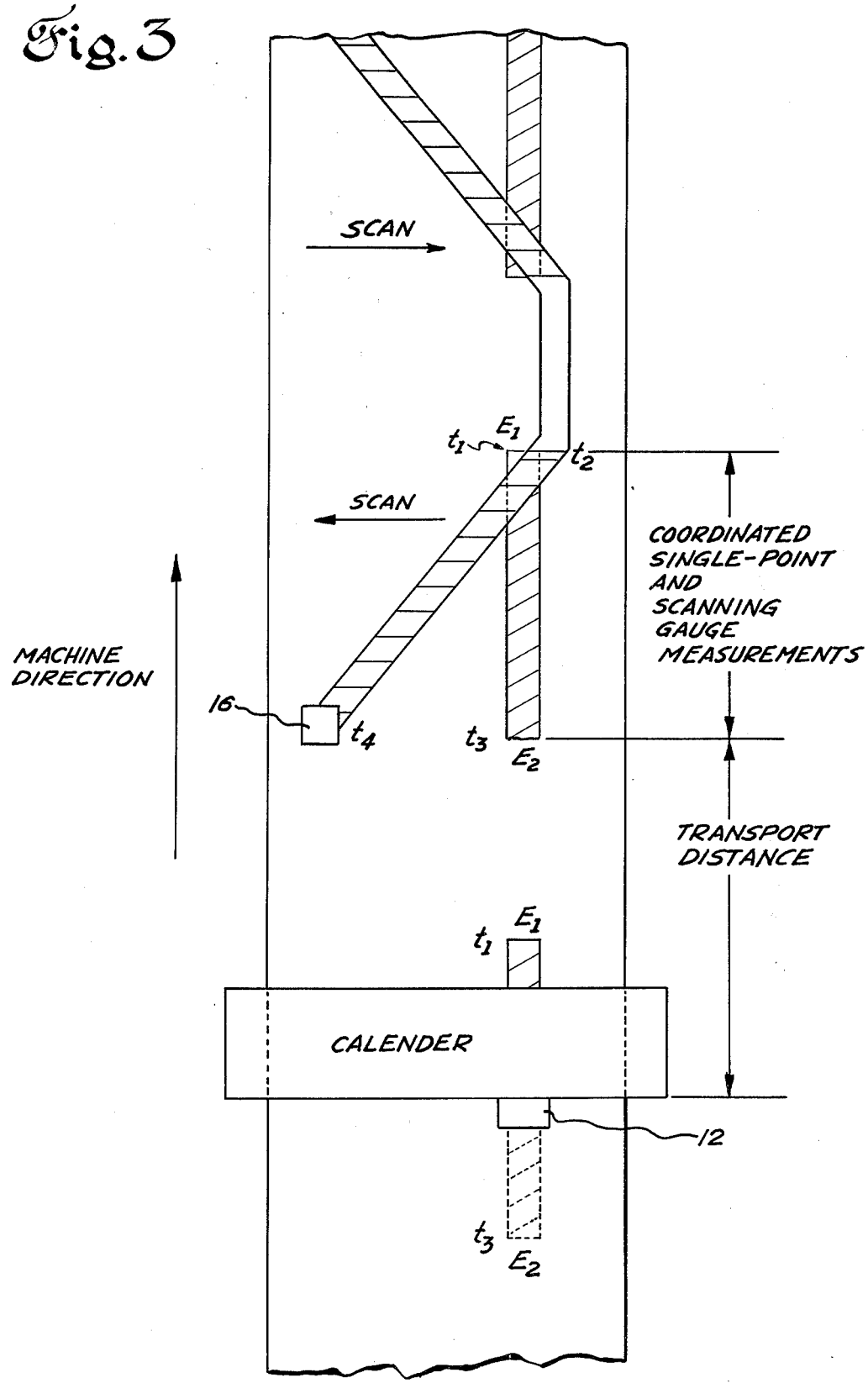

PROCESS CONTROL

The present invention relates generally to a tire calendering system for the production of rubber tire material comprising a layer of tire cord laminated between two layers of rubber, and more particularly, to an apparatus and method for monitoring and controlling a tire calendering system to produce a strip of rubber tire material having a desired total thickness and cross-section, including coordinated gauging means for measuring the thickness of the rubber tire material and a component thereof along the same length portion of the material strip.

CROSS REFERENCE TO RELATED APPLICATIONS

The present invention is related to the inventions disclosed in copending applications entitled "Process Control" of R. Heiks et al., Ser. No. 262,000 filed June 12, 1972 now U.S. Pat. No. 3,843,434, issued Oct. 22, 1974 "Measuring Gauge" of J. Donoghue, Ser. No. 261,998 filed June 12, 1972, now abandoned, and "Process Control System" of J. Donoghue et al., Ser. No. 261,999 filed June 12, 1972 now U.S. Pat. No. 3,844,870 issued Oct. 29, 1974, all assigned to the assignee of the present invention and filed on even date herewith.

BACKGROUND

In the rubber tire calendering art, control of the manufactured sheet of tire material within precise limits is of highly significant concern. The production of rubber-coated cord within close tolerances is critical both from the standpoint of the quality of the manufactured article - optimum tire appearance, controllability, safety, and longevity - and from the standpoint of reducing the costs associated with production - minimized use of raw materials, minimized production of off-spec material, and minimized unproduction machine and manpower time. A further significant result of more accurate production control is the potential for a higher production rate brought about by a heightened confidence in the ability of the system to meet target specifications.

In the usual tire calendering process, a tire cord, comprising a layer of textile, metallic, or synthetic material, is forcibly laminated between two layers of rubber by means of opposing calender rolls. These layers are usually of equal thickness, though, of course, this need not be the rule. The positioning of the tire cord within the rubber tire material laminate must be precisely controlled within close tolerances, for the reasons given above relating to tire quality and production economics. Assurance that such positioning is in fact attained is had by maintaining a relatively constant thickness in the rubber layers above and below the tire cord. In addition to the exact positioning of the cord within the rubber layers, it is also highly important that the total thickness of the calendered tire material be maintained as close as possible to a selected total thickness target. This is necessary both from the point of view of the tire building process, for which the tire material is preferably at a constant total thickness, as well as the ultimate quality of the finished tire, in that a tire having insufficient rubber will not wear properly whereas one having an excess of rubber will be subject to excessive heat build-up from internal friction forces.

In referring to the amount of rubber deposited on either side of the tire cord, the terms "thickness" and "weight" are used interchangeably in the rubber art, since if the density of the rubber material is known, its thickness can readily be calculated from a measurement of its weight per unit area. To simplify the presentation which follows, the term "thickness" will be used exclusively, with the express reservation that alternative forms of measurement are not thereby relinquished.

In a sense, this application is directed to a refinement of the invention set forth in the copending application entitled "Process Control" of R. Heiks et al. The herein-in-disclosed invention, insofar as a preferred embodiment is described, comprises a single point gauge situated at the calender ahead of the final laminating rolls for measuring the thickness of the bottom rubber layer, and a scanning gauge located downstream from the final laminating rolls for measuring the final thickness of the composite rubber tire material. The respective measurements from the single point and scanning gauges are closely coordinated, with the result that they represent a sampling of bottom thickness and total thickness, respectively, taken from substantially the same longitudinal region of the material strip. Coordinated measurements over the same strip region are attained by programming the single point gauge to measure for an amount of time substantially equal to the time of one scan of the scanning gauge.

A bottom layer control signal, which may be derived from an indication of bottom thickness different from that which is derived from the coordinated measuring sequence, is used as the basis of control actions to maintain bottom layer thickness substantially on target. A top layer control signal, which is derived from the coordinated measurements of bottom and total thickness, is used to control the top layer thickness in such a manner as to maintain the total thickness of the strip substantially on target.

In the material coating art, it is known to position a scanning gauge on either side of a material strip coating element, whereby a thickness measurement of the material strip before coating is subtracted from a total thickness measurement of the identical portion of the strip after coating. A delay means connected to a means for measuring sheet velocity may be utilized to delay the scanning action of the scanning gauge situated downstream from the coating element with respect to the scanning action of the upstream scanning gauge, so that portions of the material strip are measured before and after coating. U.S. Pat. No. 3,190,261 issued June 22, 1965, to G. F. Ziffer, and U.S. Pat. No. 3,378,676, issued Apr. 16, 1968, to J.C. Clement, assigned to the same assignee as the disclose appliciation, discloses different forms of such a material coating control system.

However, the problem in the tire calendering industry of measuring and controlling the thickness of an upper layer of rubber overlying a tire cord and a lower layer of rubber is a more difficult one.

The lower rubber layer in a tire calendering system is produced in the process immediately prior to its joinder with the upper layer, and is susceptible to rather frequent variations in its thickness, because of changing conditions such as temperature, composition of the rubber stock, etc. This, in contrast to the situation in a material coating system where a base of relatively constant dimensions is involved, may require the capability for a higher frequency of control action over the lower layer than that ordinarily attainable through the typically slower measuring period of a scanning gauge system.

Other considerations, as well, may make the use of a scanning gauge to measure bottom thickness impractical for certain calendering systems. These involve the lack of space around the calender rolls, as well as factors affecting gauge response such as irregularities along the roll surface, problems of gauge standardization, and difficulties in gauge mounting and alignment.

The tire fabric is produced by combining the two rubber layers and the cord. Due to the action of the calender on these materials, the control to a desired strip thickness requires a unique control system that relates the layer control to the total and bottom thickness measurements and controls bottom thickness.

The present invention offers a unique and precise solution to the tire calendering problem of maintaining a desired bottom thickness, total thickness, and tire cord position relative to the top and bottom layers of rubber. Additionally, it resolves the problems, peculiar to a rubber tire calendering system, involved in coordinating the bottom and total thickness measurements over the same longitudinal region of the material strip, to obtain an accurate indication of the amount by which the thickness of the top rubber layer must be altered to maintain the total thickness of the material strip at the desired total thickness target, as will be apparent from a reading of the description which follows.

SUMMARY OF THE INVENTION

We provide a tire calender monitor and control apparatus which automatically controls the tire calendering process to conform the total thickness of the calendered material to a desired target and to maintain the tire cord at a desired spacing within the calendered material. A unique gauging configuration is provided that permits the thickness of the bottom layer of rubber to be controlled nearly instantaneously to a bottom thickness target and that, in addition, provides a control signal which may be used as the basis of control over the thickness of the top layer of rubber, in order to maintain the total thickness of the calendered material at a desired target.

According to one embodiment, in which a standard 4-roll rubber calender is employed, a single point thickness gauge is positioned adjacent one of the bottom pair of calender rolls to provide an indication of the thickness of the bottom rubber layer as it passes over the roll prior to the point of lamination with the cord and the top rubber layer. A scanning thickness gauge is positioned downstream from the calender to provide an indication of the total thickness of the combined layers. The indications of thickness provided by the single point and scanning gauges are smoothed over time by averaging means. A difference computer subtracts an indication of average bottom thickness from a bottom thickness target to provide an indication of bottom error. A bottom thickness controller, in response to the bottom error indication, adjusts movable control elements on the bottom pair of calender rolls to reduce the bottom error substantially to zero and thereby maintain the bottom thickness substantially at the bottom thickness target.

A gauge coordination unit, responsive to a speed measuring unit which measures calender roll speed, controls the operation of the averaging means, as well as the traversing movements of the scanning gauge, so that indications of average bottom and total thickness are derived from essentially the same longitudinal region of the strip.

The indication of average total thickness is subtracted from a total thickness target, in a difference computer, to provide an indication of total error. In another difference computer, the indication of average bottom thickness derived from the coordinated measuring sequence is subtracted from the bottom thickness target to provide an additional indication of bottom error. This bottom error indication is subtracted from the total error indication in yet another difference computer to provide an indication of top error. A top thickness controller, in response to the top error indication, adjusts movable control elements on the top pair of calender rolls to reduce the top error substantially to zero, and thereby maintain the total thickness substantially at the total thickness target. Visual indications of the average bottom and total thicknesses are provided to the calender operator.

According to another embodiment, the separate indications of average bottom thickness and total thickness derived over the same longitudinal region of the strip are compared in a difference computer to provide an average indication of top thickness plus tire cord thickness, which indication is compared, in a difference computer, with a target representing the combined desired thickness of the top layer and the tire cord to give a top error indication. A top thickness controller, in response to the top error indication, controls adjustable control elements on the top pair of calender rolls to bring the combined thickness of the top layer and tire card substantially to target, thereby maintaining the total thickness substantially at the total thickness target. A bottom thickness controller controls the thickness of the bottom layer to a bottom thickness target in response to an indication of bottom error based on an indication of average bottom thickness which is derived independently, and which may be derived at different times, from the indication of average bottom thickness which is derived during the coordinated measuring sequence. The thickness of bottom layer is thereby maintained substantially on target at all times. Visual indications of bottom and total thickness may be provided as before.

Applicants' s unique tire calender monitor and control system, including means for deriving coordinated average indications of bottom and total thickness over substantially the same longitudinal portion of the moving material strip, maintains the total thickness of the strip substantially on target, by controlling the thickness of the bottom layer at frequent intervals to maintain the bottom layer thickness essentially constant, and by controlling the thickness of the top layer to maintain the combined thicknesses of the top layer and tire cord layer essentially constant in response to a top layer control signal, which control signal is based on said coordinated measurements of bottom and total thickness. Since measurements of bottom and total thickness are derived from substantially the same longitudinal region of the strip, machine direction variations in thickness are essentially eliminated as a source of error in the computation of the top layer control signal.

OBJECTS OF THE INVENTION

Accordingly, it is an object of the present invention to provide an improved tire calender monitor and control system which maintains a desired total thickness and cross-section in the calendered strip of material, based on the coordinated measurements of bottom thickness and total thickness by a single point gauge and a scanning gauge, respectively, over essentially the same longitudinal region of the strip.

It is a further object of the present invention to provide an improved tire calender monitor and control system in which a top thickness control signal is obtained as a function of the difference between coordinated measurements of bottom thickness and total thickness over essentially the same longitudinal region of the strip.

It is another object of the present invention to provide an improved tire calender monitor and control system, including means for coordinating measurements of bottom thickness and total thickness over essentially the same longitudinal region of the strip, in which transport is not a substantial factor with respect to bottom thickness control actions.

Further objects and advantages will become apparent from the following detailed description of the preferred apparatus according to the invention, taken in conjunction with the appended drawings.

BRIEF DESCRIPTION OF THE FIGURES

FIG. 1 is a partially perspective and partially schematic view of a tire calender apparatus, in combination with an improved tire calender monitoring and control system according to the invention.

FIG. 2 is a partially perspective and a partially schematic view of a tire calender apparatus in combination with an improved tire calender monitor and control system according to another embodiment of the invention.

FIG. 3 is a diagram representing the coordinated single point and scanning gauge measurements of thickness over the same longitudinal region of the moving material strip.

TIRE CALENDERING PROCESS

With reference now to FIG. 1, a typical 4-roll tire calender includes a top pair of coacting calender rolls 1 and 2, supporting a bank 6 of rubber at the input side thereof, and forming a top layer of rubber 8 in substantially continuous fashion at their output side. A corresponding pair of bottom calender rolls 3 and 4 support a bank 7 of rubber at the input side thereof and form a bottom layer of rubber 9 at their output side. The top layer 8 and bottom layer 9, together with the tire cord layer 5, form a composite sheet of tire material 10 as they pass through laminating rolls 2 and 3. Adjustable control elements, such as screwdown or hydraulic elements, at either end of the top and bottom pairs of calender rolls (not shown) may be actuated to vary the roll spacing to increase or decrease the thickness of top layer 8 and bottom layer 9.

THICKNESS GAUGES

A single point radiation backscatter gauge 12 is positioned adjacent one of the laminating rolls 2 or 3 to measure the thickness of the rubber layer passing over it prior to lamination with the tire cord and other rubber layer. In a preferred embodiment, the single point gauge 12 is positioned adjacent the lower of the two laminating rolls, roll 3, to measure the instantaneous thickness of the bottom rubber layer 9. Single point gauge 12 is placed at a transverse position along roll 3, such that it measures representative machine direction variations. The optimum location may be determined experimentally. Single point gauge 12 need not be limited to the radiation backscatter type, as it may be of any type suitable for measuring the thickness of a layer of material moving over a roll.

A scanning radiation transmission gauge 13, consisting of a radiation source 16 mounted for traversing movement on the pair of upper guide rails 17 and 18, and a radiation detection unit 14 mounted for traversing movement across the material strip on lower guide rails 19 and 20, is located at the output side of laminating rolls 2 and 3. The source and detector units 16 and 14, respectively, are traversed by means of a motor 22 powering a drive chain (not shown) attached to the source and detector units 16 and 14 and extending between transmission gauge supports 24 and 25 situated on either side of the rubber material strip 10. Scanning gauge 13 need not be limited to a radiation transmission gauge, but may be of any other well known type for measuring the thickness of material.

The scanning gauge 13 need not scan the entire width of the strip of rubber 10, but is a preferred embodiment, in order to measure a sufficiently representative portion of the strip 10, it is in fact programmed to scan substantially the entire width of the sheet 10.

The instantaneous values of bottom and total thickness measured by gauges 12 and 13, respectively, are averaged by suitable well known averaging means 44, 45 and 46 to provide indications of bottom and total thickness which reflect a smoothing of the measured values over time, resulting in more accurate and representative indications.

AUTOMATIC BOTTOM THICKNESS CONTROL

As seen in FIG. 1, an indication of average bottom thickness is read out of averaging means 45 into difference computer 47 upon the closing of switch 72 by programmer 50 over control line 55. Averaging means 45 is reset by programmer 50. The indication of average bottom thickness is compared with a selected bottom thickness target in difference computer 47, which outputs an indication of bottom error $e_{BOT}$. Bottom thickness controller 38, in response to the indication of bottom error $e_{BOT}$, effects a bottom layer control action between rolls 3 and 4, represented by dotted line 42, upon the closing of switch 43 by programmer 50 over control line 58, to increase or decrease the thickness of bottom layer 9 in order to reduce the bottom error indication $e_{BOT}$ substantially to zero, depending upon the amount of apparatus inertia, deadbands, and other factors affecting control response.

The frequency of bottom thickness control actions is determined by the predetermined time over which the instantaneous measurements of bottom thickness are averaged plus the time required to calculate and output the necessary corrections to roll 4 plus the slight transport delay time between single point gauge 12 and the point at which the corrections are applied. Because the error calculation and correction times, under normal operating conditions, are short, and because the transport delay time is very small, the bottom layer thickness can be controlled frequently and substantially instantaneously to target.

COORDINATED SINGLE POINT AND SCANNING GAUGE MEASUREMENTS

For the purpose of controlling the total thickness of the combined material strip 10 to a selected total thickness target, a control signal is calculated based upon separate indications of average bottom thickness and average total thickness provided by averaging means 44 and 46, respectively, which control signal is representative of the amount of thickness of the top layer must be changed in order to conform total thickness to target (assuming that any component of total thickness error which is attributable to bottom thickness error will be corrected for by the bottom thickness control loop).

So that the indications of average bottom thickness and average total thickness upon which the control signal is derived represent samplings of thickness obtained over the same longitudinal portion of strip 10, programmer 50 coordinates the measuring functions of gauges 12 and 13 and the averaging functions of averaging means 44 and 46. To this end programmer 50 delays the initiation of a scanning action by scanning gauge 13 and the associated averaging of total thickness indications by averaging means 44 until the leading edge of the portion of bottom layer 9 measured by single point gauge 12 and sampled by averaging means 45 reaches the location of scanning gauge 13. Programmer 50 terminates the sampling of measurements from single point gauge 12 in such a manner that the trailing edge of the portion of the bottom sheet 9 measured by gauge 12 reaches the location of the scanning gauge 13 when gauge 13 has completed its traversal of the moving strip 10. By the fact that the indication of average bottom layer thickness is derived from the same machine direction region as that for overall thickness, any machine direction variations occurring within this region will have an equal effect on both measurements.

With reference now to FIGS. 1 and 3, the coordinated measuring actions of single point gauge 12 and scanning gauge 13 will be explained in detail. Programmer 50 is essentially a timing and switching unit which performs three functions: (1) it controls the traversing movements of scanning gauge 13 via lines 51 and 52 which respectively sense the lateral position of gauge 13 with respect to strip 10, and control the traversing movements of gauge 13, (2) it controls the independent sampling of thickness measurements from gauges 12 and 13 by means of switches 71, 72, and 73, which are controlled by lines 54, 55, and 59, respectively, and (3) it controls the operation of averaging means 44, 45, and 46 associated with gauges 12 and 13, respectively, over lines 56, 57, and 60. The construction of this timing and switching unit in various hardware forms or the suitable programming of a digital computer to carry out its functions will be sufficiently clear to one skilled in the art.

Speed measuring unit 49 provides programmer 50 with an indication of the roll speed, from which the transport delay time is calculated, based on the known machine direction distance between gauges 12 and 13. Reference may be had to the aforementioned patent to G. F. Ziffer with respect to a variable delay means responsive to a speed measuring device for use in synchronizing two gauges.

To initiate a coordinated measurement, programmer 50, having previously cleared averaging means 44, initiates a sampling action by averaging means 44 over line 56 at time $t_1$ to average and store indications of instantaneous bottom thickness provided by gauge 12 over a longitudinally-shaped portion of the bottom layer 9 (FIG. 3). The sampling action by averaging means 44 is terminated by programmer 50 at time $t_3$, corresponding to the trailing edge $E_2$ of the measured portion. When the leading edge $E_1$ of the measured portion reaches the location of scanning gauge 13, programmer 50, having previously cleared averaging means 46, initiates the traversing scan of gauge 13 at a constant speed and initiates a sampling action by averaging means 46 at time $t_2$, to average and store indications of instantaneous total thickness provided by gauge 13 along an obliquely transverse portion of the composite strip 10. Time $t_2$ occurs subsequent to time $t_1$ by an amount of time equal to the transport delay time between gauges 12 and 13. At time $t_4$ the sampling action by averaging means 46 is terminated by programmer 50, coincident with the arrival of the trailing edge $E_2$ of the single point measured portion at the location of the scanning gauge 13. Time $t_4 - t_2$ respresents the time required for gauge 13 to traverse strip 10 and is equal to time $t_3 - t_1$ during which indications of bottom thickness are sampled and averaged.

Upon the termination of the coordinated measuring sequence, programmer 50 closes switch 71 over line 54 and switch 73 over line 59 to enter the averaged indications of bottom thickness and total thickness stored in averaging means 44 and 46 into difference computers 40 and 42, respectively, for the purposes of calculating a control signal with which the total thickness of strip 10 can be conformed to a selected target, as described below. Averaging means 44 and 46 are then cleared by programmer 50.

The separate indications of average bottom and total thickness are made visible to the tire calender operator by means of thickness display means 31 and 33, which may be any well known digital display means. Visual display means 31 and 33 provide the calender operator with a reliable real-time check on the automatic control functions of the calendering system.

AUTOMATIC TOTAL THICKNESS CONTROL

With reference to FIG. 1, the derivation of a control signal for controlling total thickness to a selected total thickness target, in a preferred embodiment, will be explained.

The indication of average bottom thickness read into difference computer 42 is compared with a selected bottom thickness target, and an indication of bottom error $e_{BOT}$ is read into difference computer 30. The indication of average total thickness read into difference computer 40 is compared with a selected total thickness target, and an indication of total error $e_{TOTAL}$ is read into difference computer 30. Difference computer 30 outputs an indication of top error $e_{TOP}$ representative of the difference between the indication of total error $e_{TOTAL}$ and the indication of bottom error $e_{BOT}$. Top thickness controller 36, responsive to the top error indication $e_{TOP}$, effects a top layer control action between rolls 1 and 2, shown by dotted line 40, upon the closing of switch 41 by programmer 50 over line 61, to alter the spacing between rolls 1 and 2 in the appropriate direction to reduce the top error indication substantially to zero.

Besides maintaining a desired total thickness, the position of the tire cord is maintained relatively constant with respect to the top and bottom rubber layers, since the thickness of the bottom layer is maintained essentially constant, while the thickness of the top layer varies only to the degree that variations in the thickness of the tire cord, temperature changes, or other process variations may cause a change in the total thickness.

With the assurance that the bottom error $e_{BOT}$ will be corrected by the bottom thickness feedback control loop, the bottom error $e_{BOT}$ is eliminated as a factor in calculating the necessary correction to be applied to the top layer thickness required to conform the total thickness to target, thereby avoiding double correction of bottom thickness. Moreover, the number of gauges required to maintain both tire cord balance and total thickness is kept to a minimum, resulting in substantial cost savings over calender control systems of the prior art.

With reference now to FIG. 2, another embodiment of applicants' invention is shown. According to this embodiment, bottom thickness is controlled essentially as in the aforementioned embodiment described with reference to FIG. 1. Indications of bottom thickness and total thickness are also displayed as before.

As an alternative to the control of top thickness based upon a top error derived as a function of the difference between total error and bottom error, FIG. 2 shows an embodiment in which the combined thickness of the top layer 8 plus the layer of tire cord 5 is controlled to a desired target, which target is chosen such that it together with the bottom target equals the desired total thickness target.

To this end, the respective indications of average bottom thickness and average total thickness derived from the coordinated measuring sequence, as described above, are read into difference computer 32 upon the closing of switches 71 and 73, associated with averaging means 44 and 46, by programmer 50. The indication of average bottom thickness is compared with the indication of average total thickness in difference computer 31 to provide an indication of the combined thickness of the top layer 8 and the cord layer 5. This indication is compared in difference computer 40 with a target representing the desired total thickness target minus the desired bottom thickness target, i.e., representing the desired thickness in the combined top and cord layers, to provide an indication of top error $e_{TOP}$. A top thickness controller 36, in response to the top error indication $e_{TOP}$, outputs corrections to roll 1, essentially as described with respect to the embodiment shown in FIG. 1.

While a preferred embodiment of the invention has been shown and described, it will be apparent to one skilled in the art that numerous modifications may be made thereto without departing from the scope and intent of the invention as recited in the appended claims. For example, the scanning gauge need not scan the entire width of the strip but may scan only a portion thereof. Further, the scanning gauge may make several changes in direction during a scanning sequence to obtain a more representative sampling over the strip region; in this mode of operation, the termination times $t_3$ and $t_4$ would be suitably modified to accomodate a plurality of traversals by the scanning gauge. Also, more than one single point gauge may be utilized to measure bottom thickness should a sufficiently representative measurement of bottom thickness not be attained through the use of one gauge.

It will further be apparent that the top thickness target need not be identical to the bottom thickness target. Moreover, these targets need not remain fixed, but may be altered according to the statistical variance of measured thickness, in the manner disclosed in U.S. Pat. No. 3,515,860, issued June 2, 1970 to C. T. Fitzgerald, Jr. and assigned to the same assignee as the present application. By the application of this technique, known as "target optimization control", the degree of controllability of a process is automatically sensed, and the process is automatically operated closed to or further from the predetermined target thickness, depending on the controllability as determined by the statistical variance of the process.

It is to be understood that a digital computer may be employed to perform the functions of gauge coordination, measurement averaging and subtracting, and target comparison, as well as the delaying of consecutive screwdown actions initiated by controller 36 on account of transport delay considerations.

It will be understood that means, not shown, may be employed to delay the sampling action of averaging means 44 until a time equal to the transport delay time between the calender and the location of the scanning gauge 13 has elapsed since the preceeding corrective action.

The total thickness target is set according to the desired total thickness of the laminated tire material, consisting of the tire cord and upper and lower rubber layers. The actual value used in the calender control system will be dependent upon the composition of the tire cord and rubber, the geometry of the gauge setup, the type of radiation, and other factors affecting transmissivity.

While the figures show the control corrections to either end of roll 1 and roll 4 to be equal in magnitude in the preferred embodiment, separate gain factors may be built into controllers 36 and 38 allowing for unequal control correction actions in order to account for irregularities in the roll surfaces or in the response of the control elements.

We claim:
1. Apparatus for automatically controlling a tire calendar to maintain a desired thickness profile in a strip of laminated sheet material including first and second layers of rubber and in intermediate layer of tire cord, in which said first layer of rubber is formed in a substantially continuous fashion between a first pair of coacting calender rolls having adjustable elements at either end thereof for adjusting the spacing between said first pair of rolls to vary the thickness of said first layer of rubber, and said second layer of rubber is formed in a substantially continuous fashion between a second pair of coacting calender rolls having adjustable elements at either end thereof for adjusting the spacing between said second pair of rolls to vary the thickness of said second layer of rubber, and in which said layer of tire cord is laminated between said first and second layers of rubber by adjoining calender rolls, said apparatus comprising
first measuring means located in a fixed position adjacent one of said adjoining calender rolls at the input side thereof for providing indications of the thickness of said first layer of rubber,
second measuring means located at the strip output side of said adjoining calender rolls for providing indications of the total thickness of said strip and being arranged to scan across said strip,
means for averaging the indications of thickness provided by said first measuring means to provide a first signal and for separately averaging the indica- tions of thickness provided by said second measuring means to provide a second signal, first comparison means for comparing the first signal indication of average first layer thickness with a first layer target to provide a first layer error indication, first controller means responsive to said first layer error indication for actuating said adjustable elements associated with said first pair of coating calender rolls to maintain said first layer thickness substantially at said first layer target, means for coordinating the operation of said first and second measuring means and said averaging means, whereby said averaging means provides a third signal that provides an indication of average first layer thickness for a period of time substantially equal to the time required by said second measuring means to traverse a selected portion of said strip to provide the second signal indication of average total thickness, and said traversal by said second measuring means is delayed by an amount of time necessary to ensure that the respective indications provided by said first and second measuring means and separately averaged by said averaging means to produce said second and third signals, respectively, are derived from substantially the same longitudinal portion of said strip, combining means responsive to said third signal indication of average first layer thickness and said second signal indication of average total thickness for providing a control signal representing the change in thickness of said layer required to maintain the total thickness of said strip at a total thickness target, and second controller means responsive to said control signal for actuating said adjustable elements associated with said second pair of coacting calender rolls, to maintain said total thickness substantially at said total thickness target.

2. Apparatus according to claim 1, wherein said second measuring means traverses substantially the entire width of said strip to provide said indications of total thickness.

3. Apparatus for automatically controlling a tire calender to maintain a desired thickness profile in a strip of laminated sheet material including first and second layers of rubber and an intermediate layer of tire cord, in which said first layer of rubber is formed in a substantially continuous fashion between a first pair of coacting calender rolls having adjustable elements at either end thereof for adjusting the spacing between said first pair of rolls to vary the thickness of said first layer of rubber, and said second layer of rubber is formed in a substantially continuous fashion between a second pair of coacting calender rolls having adjustable elements at either end thereof for adjusting the spacing between said second pair of rolls to vary the thickness of said second layer of rubber, and in which said layer of tire cord is laminated between said first and second layers of rubber by adjoining calender rolls, said apparatus comprising first measuring means located in a fixed position adjacent one of said adjoining calender rolls at the input side thereof for providing indications of the thickness of said first layer of rubber, second measuring means located at the strip output side of said adjoining calender rolls for providing indications of the total thickness of said strip and being arranged to scan across said strip, means for averaging the indications of thickness provided by said first measuring means to provide a first signal and for separately averaging the indications of thickness provided by said second measuring means, to provide a second signal, first comparison means for comparing the first signal indication of average first layer thickness with a first layer target to provide a first layer error indication, first controller means responsive to said first layer error indication for actuating said adjustable elements associated with said first pair of coacting calender rolls, to maintain said first layer thickness substantially at said first layer target, means for coordinating the operation of said first and second measuring means and said averaging means, whereby said averaging means provides a third signal that provides an indication of average first layer thickness for a perior of time substantially equal to the time required by said second measuring means to traverse a selected portion of said strip to provide the second signal indication of average total thickness, and said traversal by said second measuring means is delayed by an amount of time necessary to ensure that the respective indications provided by said first and second measuring means and separately averaged by said averaging means to produce said second and third signals, respectively, are derived from substantially the same longitudinal portion of said strip, second comparison means for comparing said third signal indication of average first layer thickness with said first layer target to provide an additional first layer error indication, third comparison means for comparing said second signal indication of average total thickness with a total thickness target to provide a total error indication for said laminated strip, fourth comparison means for comparing said third signal first layer error indication with said total error indication to provide an error indication for said second layer, and second controller means responsive to said second layer error indication for actuating said adjustable elements associated with said second pair of coacting calender rolls, to maintain said total thickness substantially at said total thickness target.

4. Apparatus according to claim 3, wherein said second measuring means traverses substantially the entire width of said strip to provide said indications of total thickness.

5. Apparatus for automatically controlling a tire calender to maintain a desired thickness profile in a strip of laminated sheet material including first and second layers of rubber and an intermediate layer of tire cord, in which said first layer of rubber is formed in a substantially continuous fashion between a first pair of coacting calender rolls having adjustable elements at either end thereof for adjusting the spacing between said first pair of rolls to vary the thickness of said first layer of rubber, and said second layer of rubber is formed in a substantially continuous fashion between a second pair of coacting calender rolls having adjustable elements at either end thereof for adjusting the spacing between said second pair of rolls to vary the thickness of said second layer of rubber, and in which said layer of tire cord is laminated between said first and second layers of rubber by adjoining calender rolls, said apparatus comprising first measuring means located in a fixed position adjacent one of said adjoining calender rolls at the input side thereof for providing indications of the thickness of said first layer of rubber, second measuring means located at the strip output side of said adjoining calender rolls for providing indications of the total thickness of said strip and being arranged to scan across said strip, means for averaging the indications of thickness provided by said first measuring means to provide a first signal and for separately averaging the indications of thickness provided by said second measuring means to provide a second signal, first comparison means for comparing the first signal indication of average first layer thickness with a first layer target to provide a first layer error indication, first controller means responsive to said first layer error indication for actuating said adjustable elements associated with said first pair of coacting calender rolls, to maintain said first layer thickness substantially at said first layer target, means for coordinating the operation of said first and second measuring means and said averaging means, whereby said averaging means provides a third signal that provides an indication of average first layer thickness for a period of time substantially equal to the time required by said second measuring means to traverse a selected portion of said strip to provide the second signal indication of average total thickness, and said traversal by said second measuring means is delayed by an amount of time necessary to ensure that the respective indications provided by said first and second measuring means and separately averaged by said averaging means to produce said second and third signals, respectively, are derived from substantially the same longitudinal portion of said strip, means responsive to said third signal indication of first layer thickness and to said second signal to provide a fifth signal that indicates the average combined thicknesses of said second layer and said tire cord, and second controller means responsive to said fifth signal indication for actuating said adjustable elements associated with said second pair of coacting calender rolls to maintain the combined thicknesses of said second layer and said tire cord substantially at a second target, the sum of said first layer target and said second target being equal to a desired thickness target, whereby said total thickness is maintained substantially at said total thickness target.

6. Apparatus according to claim 5, wherein said second measuring means traverses substantially the entire width of said strip to provide said indications of total thickness.

7. Apparatus for automatically controlling a tire calender to maintain a desired thickness profile in a strip of laminated sheet material including first and second layers of rubber and an intermediate layer of tire cord, in which said first layer of rubber is formed in a substantially continuous fashion between a first pair of coacting calender rolls having adjustable elements at either end thereof for adjusting the spacing between said first pair of rolls to vary the thickness of said first layer of rubber, and said second layer of rubber is formed in a substantially continuous fashion between a second pair of coacting calender rolls having adjustable elements at either end thereof for adjusting the spacing between said second pair of rolls to vary the thickness of said second layer of rubber, and in which said layer of tire cord is laminated between said first and second layers of rubber by adjoining calender rolls, said apparatus comprising first measuring means located in a fixed position adjacent one of said adjoining calender rolls at the input side thereof for providing indications of the thickness of said first layer of rubber, second measuring means located at the strip output side of said adjoining calender rolls for providing indications of the total thickness of said strip and being arranged to scan across said strip, means for averaging the indications of thickness provided by said first measuring means to provide a first signal and for separately averaging the indications of thickness provided by said second measuring means to provide a second signal, first comparison means for comparing the first signal indication of average first layer thickness with a first layer target to provide a first layer error indication, first controller means responsive to said first layer thickness indication for actuating said adjustable elements associated with said first pair of coacting calender rolls to maintain said first layer thickness substantially at said first layer target, means for coordinating the operation of said first and second measuring means and said averaging means, said coordinating means initiating said averaging means to provide a third signal indication of average first layer thickness measured by said first measuring means along the length of the strip and to provide said second signal indication of average total thickness measured by said second measuring means along the same strip length portion, combining means responsive to said third signal indication of average first layer thickness and to said second signal indication of average total thickness for providing a control signal representing the change in thickness of said second layer required to maintain the total thickness of said strip at a total thickness target, and second controller means responsive to said second layer error indication for actuating said adjustable elements associated with said second pair of coacting calender rolls, to maintain said total thickness substantially at said total thickness target.

8. Apparatus according to claim 7, wherein said second measuring means traverses substantially the entire width of said strip to provide said indications of total thickness.

9. Method for maintaining a desired thickness profile in a moving strip of laminated sheet material produced in a tire calendering process, said sheet material including a first layer of rubber, a second layer of rubber, and an intermediate layer of tire cord, said method comprising measuring the thickness of said first layer of rubber as it passes a point prior to lamination with said second layer of rubber and said tire cord to provide indications of the thickness of said first layer of rubber,
measuring the total thickness of said laminated strip subsequent to the lamination of said first and second rubber layers with said first cord to provide indications of the total thickness of said laminated strip at a plurality of transverse points on said strip,
said first layer thickness measurement being made at a fixed, cross sheet location while the total thickness indications are beng measured at the plural points,
averaging said indications of first layer thickness over a first predetermined time period to provide an indication of average first layer thickness,
comparing said indication of average first layer thickness with a first layer target to provide a first layer error indication,
controlling said first layer thickness substantially to said first layer target in response to said first layer error indication,
averaging said indications of total thickness provided at a substantial number of said plurality of transverse points during a second predetermined time period,
averaging said indications of first layer thickness over a time substantially equal to said second predetermined time period to provide an additional indication of average first layer thickness,
initiating the averaging of said indications of total thickness after a time equal to the transport delay time between the locations along the strip length at which the respective measurements of said first layer and said strip are made has elapsed since the initiation of averaging of said indications of first layer thickness, so that the averaged indications of first layer thickness and total thickness are derived from substantially the same longitudinal portion of the strip,
combining said additional indication of average first layer thickness and said indication of average total thickness to provide a control signal representing the change in thickness of said second layer required to maintain the total thickness of said strip at a total thickness target, and
controlling said second layer thickness in response to said control signal to maintain said total thickness substantially at said total thickness target.

10. Apparatus for automatically controlling a tire calender to maintain a desired thickness profile in a strip of laminated sheet material including first and second layers of rubber and an intermediate layer of tire cord, in which said first layer of rubber is formed in a substantially continuous fashion between a first pair of coacting calender rolls having adjustable elements at either end thereof for adjusting the spacing between said first pair of rolls to vary the thickness of said first layer of rubber, and said second layer of rubber is formed in a substantially continuous fashion between a second pair of coacting calender rolls having adjustable elements at either end thereof for adjusting the spacing between said second pair of rolls to vary the thickness of said second layer of rubber, and in which said layer of tire cord is laminated between said first and second layers of rubber by adjoining calender rolls, said apparatus comprising first measuring means located in a fixed position adjacent one of said adjoining calender rolls at the input side thereof for providing indications of the thickness of said first layer of rubber, second measuring means located at the strip output side of said adjoining calender rolls for providing indications of the total thickness of said strip and being arranged to scan across said strip,
means for averaging the indications of thickness provided by said first measuring means to produce first and second signals and for separately averaging the indications of thickness provided by said second measuring means to produce a third signal,
first comparison means for comparing said first signal indication of average first layer thickness with a first layer target to provide a first layer error indication,
first controller means responsive to said first layer error indication for actuating said adjustable elements associated with said first pair of coacting calender rolls to maintain said first layer thickness substantially at said first layer target,
means for coordinating the operation of said first and second measuring means and said averaging means, whereby said averaging means second signal provides an indication of average first layer thickness for a period of time substantially equal to the time required by said second measuring means to traverse a selected portion of said strip to provide said second signal indication of average total thickness, and said traversal by said second measuring means is delayed by an amount of time necessary to ensure that the respective indications provided by said first and second measuring means for said second signal and said third signal and separately averaged by said averaging means are derived from substantially the same longitudinal portion of said strip,
combining means responsive to said second signal indication of average first layer thickness provided through the action of said coordinating means and to said third signal indication of average total thickness for providing a control signal representing the change in thickness of said second layer required to maintain the total thickness of said strip at a total thickness target, and
second controller means responsive to said control signal for actuating said adjustable elements associated with said second pair of coacting calender rolls, to maintain said total thickness substantially at said total thickness target.

11. Apparatus according to claim 10, wherein said second measuring means traverses substantially the entire width of said strip to provide said indications of total thickness.

12. Apparatus for automatically controlling a tire calender to maintain a desired thickness profile in a strip of laminated sheet material including first and second layers of rubber and an intermediate layer of tire cord, in which said first layer of rubber is formed in a substantially continuous fashion between a first pair of coacting calender rolls having adjustable elements at either end thereof for adjusting the spacing between said first pair of rolls to vary the thickness of said first layer of rubber, and said second layer of rubber is formed in a substantially continuous fashion between a second pair of coacting calender rolls having adjustable elements at either end thereof for adjusting the spacing between said second pair of rolls to vary the thickness of said second layer of rubber, and in which said layer of tire cord is laminated between said first and second layers of rubber by adjoining calender rolls, said apparatus comprising first measuring means located in a fixed position adjacent one of said adjoining calender rolls at the input side thereof for providing indications of the thickness of said first layer of rubber, second measuring means located at the strip output side of said adjoining calender rolls for providing indications of the total thickness of said strip and being arranged to scan across said strip, first means for averaging the indications of thickness provided by said first measuring means to provide a first signal, second means for averaging the indications of thickness provided by said second measuring means to provide a second signal, third means for averaging the indications of thickness provided by said first measuring means to provide a third signal, said third averaging means being capable of averaging said indications at more frequent time intervals than said first averaging means, first comparison means responsive to said third signal for comparing an indication of average first layer thickness with a first layer target to provide a first layer error indication, first controller means responsive to said first layer error indication for actuating said adjustable elements associated with said first pair of coacting calender rolls, to maintain said first layer thickness substantially at said first layer target, means for coordinating the operation of said first and second measuring means and said first and second averaging means, whereby said first signal provides an indication of average first layer thickness for a period of time substantially equal to the time required by said second measuring means to traverse a selected portion of said strip and said second signal provides an indication of average total thickness, and said traversal by said second measuring means is delayed by an amount of time necessary to ensure that the respective indications provided by said first and second measuring means and separately averaged by said first and second averaging means are derived from substantially the same longitudinal portion of said strip, Combining means responsive to said first signal indication of average first layer thickness provided by said first averaging means and to said second signal indication of average total thickness provided by said second averaging means for providing a control signal representing the change in thickness of said second layer required to maintain the total thickness of said strip at a total thickness target, and second controller means responsive to said control signal for actuating said adjustable elements associated with said second pair of coacting calender rolls, to maintain said total thickness substantially at said total thickness target, whereby said first controller means is capable of more frequent control actuations than said second controller means.

13. Apparatus according to claim 12, wherein said second measuring means traverses substantially the entire width of said strip to provide said indications of total thickness.

* * * * *